US010893422B2

(12) United States Patent
Lai

(10) Patent No.: US 10,893,422 B2
(45) Date of Patent: Jan. 12, 2021

(54) APPARATUS, METHOD, AND PRODUCT FOR SELECTING A BASE STATION

(71) Applicant: Lenovo (Beijing) Co., LTD., Beijing (CN)

(72) Inventor: Xuefeng Lai, Beijing (CN)

(73) Assignee: Lenovo (Beijing) Co. LTD, Beijing (CN)

( * ) Notice: Subject to any disclaimer, the term of this patent is extended or adjusted under 35 U.S.C. 154(b) by 0 days.

(21) Appl. No.: 16/688,886

(22) Filed: Nov. 19, 2019

(65) Prior Publication Data

US 2020/0092735 A1    Mar. 19, 2020

Related U.S. Application Data

(63) Continuation of application No. 15/529,448, filed as application No. PCT/CN2015/075405 on Mar. 30, 2015, now Pat. No. 10,524,137.

(30) Foreign Application Priority Data

Nov. 24, 2014    (CN) .......................... 2014 1 0685589

(51) Int. Cl.
*H04W 24/02*       (2009.01)
*H04W 52/02*       (2009.01)
(Continued)

(52) U.S. Cl.
CPC ........... *H04W 24/02* (2013.01); *H04L 5/0032* (2013.01); *H04W 52/0206* (2013.01);
(Continued)

(58) Field of Classification Search
CPC ............. H04W 24/02; H04W 52/0206; H04W 52/0245; H04W 84/045; H04L 5/0032;
(Continued)

(56) References Cited

U.S. PATENT DOCUMENTS 10,306,533 B2 *   5/2019   Cheng ................. H04W 40/246
2012/0113971 A1   5/2012   Giaretta et al.
(Continued)

FOREIGN PATENT DOCUMENTS

CN    103874173 A    6/2014
CN    104159242 A    11/2014
(Continued)

OTHER PUBLICATIONS

PCT/CN2015/075405, "International Search Report", dated Aug. 28, 2015, pp. 3.
(Continued)

*Primary Examiner* — Omar J Ghowrwal
(74) *Attorney, Agent, or Firm* — Kunzler Bean & Adamson

(57) ABSTRACT

An apparatus, method, and computer program are disclosed for selecting an optimal small cell base station ("small cell") for a UE within wireless communication range of a macro cell base station ("macro cell"). The apparatus includes a processor for the macro cell and a memory storing program code executable to cause the macro cell to receive measurements of co-frequency interference between individual small cells of a group within wireless communication range of the macro cell, receive signal strength measurements for the small cells from a user equipment ("UE") within wireless communication range of the macro cell, and select one of the small cells of the group as an optimal base station for the UE, based on the signal strength measurements received from the UE for the individual small cells and on measurements of co-frequency interference between the individual small cells. A method and computer program perform functions of the apparatus.

18 Claims, 8 Drawing Sheets

(51) Int. Cl.
*H04L 5/00* (2006.01)
*H04W 84/04* (2009.01)
(52) U.S. Cl.
CPC ...... *H04W 52/0245* (2013.01); *H04W 84/045* (2013.01); *Y02D 30/70* (2020.08)
(58) Field of Classification Search
CPC ............... Y02D 30/70; Y02D 70/1262; Y02D 70/1264; Y02D 70/00
See application file for complete search history.

(56) References Cited

U.S. PATENT DOCUMENTS

| | | | | |
|---|---|---|---|---|
| 2012/0315935 | A1* | 12/2012 | Wang Helmersson | ...................... H04W 16/14 455/501 |
| 2015/0119047 | A1* | 4/2015 | Macias | ............... H04W 36/165 455/444 |
| 2015/0223239 | A1* | 8/2015 | Lee | ................... H04W 72/0426 370/329 |
| 2016/0007406 | A1* | 1/2016 | Yi | ......................... H04W 76/28 370/252 |
| 2017/0013591 | A1* | 1/2017 | Byun | ................ H04W 36/0055 |
| 2020/0213941 | A1* | 7/2020 | Mochizuki | ............ H04W 16/32 |

FOREIGN PATENT DOCUMENTS

| | | | |
|---|---|---|---|
| EP | 2533595 A1 | 12/2012 | |
| WO | 2014140667 A1 | 9/2014 | |
| WO | WO-2015168945 A1 * | 11/2015 | ............ H04W 52/02 |

OTHER PUBLICATIONS

PCT/CN2015/075405, "Written Opinion of the International Searching Authority", dated Aug. 28, 2015, pp. 3.

\* cited by examiner

Determining whether there are Q third electronic devices that transmit the second signal among the M third electronic devices within the predetermined distance range of the second electronic device, if yes, receiving a fourth measurement result on the second signal of the Q third electronic devices and transmitted by the second electronic device — 401

Selecting, based on the fourth measurement result, a third electronic device that satisfies a second condition from among the Q third electronic devices, taking the selected third electronic device as a service equipment of the second electronic device — 402

FIG. 4

Determining whether there are Q third electronic devices that transmit the second signal among the M third electronic devices within the predetermined distance range of the second electronic device, if yes, receiving a fourth measurement result on the second signal of the Q third electronic devices and transmitted by the second electronic device — 501

When it is determined based on the fourth measurement result that none of the Q third electronic devices satisfies the second condition, transmitting a sixth instruction to the Q third electronic devices, so that the Q third electronic devices transmit the second signal with a signal strength having an increased corresponding value; until it is determined that that is a third electronic device that satisfies the second condition, or the Q third electronic devices transmit the second signal with a maximum threshold — 502

Selecting, based on the fourth measurement result, a third electronic device that satisfies a second condition from among the Q third electronic devices, taking the selected third electronic device as a service equipment of the second electronic device — 503

APPARATUS, METHOD, AND PRODUCT FOR SELECTING A BASE STATION

CROSS-REFERENCE TO RELATED APPLICATIONS

This application is a continuation of application Ser. No. 15/529,448 filed on May 24, 2017, which is hereby incorporated by reference in its entirety.

FIELD

The present disclosure relates to the field of information processing apparatuses and methods, and more particularly, to information processing apparatuses and methods for an electronic device comprising a macro cell base station for a wireless communication network.

BACKGROUND

In a Long Term Evolution-Advanced (LTE-A) mobile communication system, Small Cell is introduced in order to enhance the capacity of network users in a hot spot, increase the flexibility of network deployment, and meanwhile improve the spectral utilization Small Cell is quite different from the previous concepts of Home eNB and Pico Cell: based on whether a Small Cell can be independent of a Macro Cell, the Small Cell can be divided into Standalone Small Cell and Non-standalone Small Cell, the Standalone Small Cell refers to that operation of the Small Cell can be completely independent of a Macro Base Station, it is mainly to solve a coverage problem; whereas the Non-standalone Small Cell refers to operation of the Small Cell must rely on a Macro Base Station, needs the Macro Base Station to schedule, it is mainly to share the Macro Base Station's load The Macro Base Station and the Small Cell adopt different frequency bands or the same frequency band. For example, the Small Cell usually adopts a frequency band of 35 GHz Due to the small coverage of the Small Cell, deployment of the Small Cell is not as strict as that of a Macro Cell after the Small Cell is completely turned on, co-frequency interference between the Small Cells or between the Macro Cell and the Small Cell are very serious. Related measures are required to avoid such interference However, currently, there are no related techniques available for reference.

SUMMARY

An apparatus, method, and computer program are disclosed for selecting an optimal small cell base station as a service equipment for a UE within wireless communication range of a macro cell base station from among a group of small cell base stations also within wireless communication range of the macro cell base station.

An apparatus, in one embodiment, includes a processor for a macro cell base station ("macro cell") for a wireless communication network and a memory storing program code executable by the processor to cause the processor to receive measurements of co-frequency interference between individual small cell base stations ("small cells) for a group of small cells within wireless communication range of the macro cell, receive signal strength measurements for the individual small cells of the group from a user equipment ("UE") within wireless communication range of the macro cell, and select one of the small cells of the group as an optimal base station for the UE, based on the signal strength measurements received from the UE for the individual small cells within the group and on measurements of co-frequency interference between the individual small cells of the group. In various embodiments, a method and a computer program may perform functions of the apparatus.

BRIEF DESCRIPTION OF THE DRAWINGS

FIG. 4 is a flowchart of an information processing method according to a fourth embodiment of present disclosure;

FIG. 5 is a flowchart of an information processing method according to a fifth embodiment of present disclosure;

DETAILED DESCRIPTION

Figure 1:
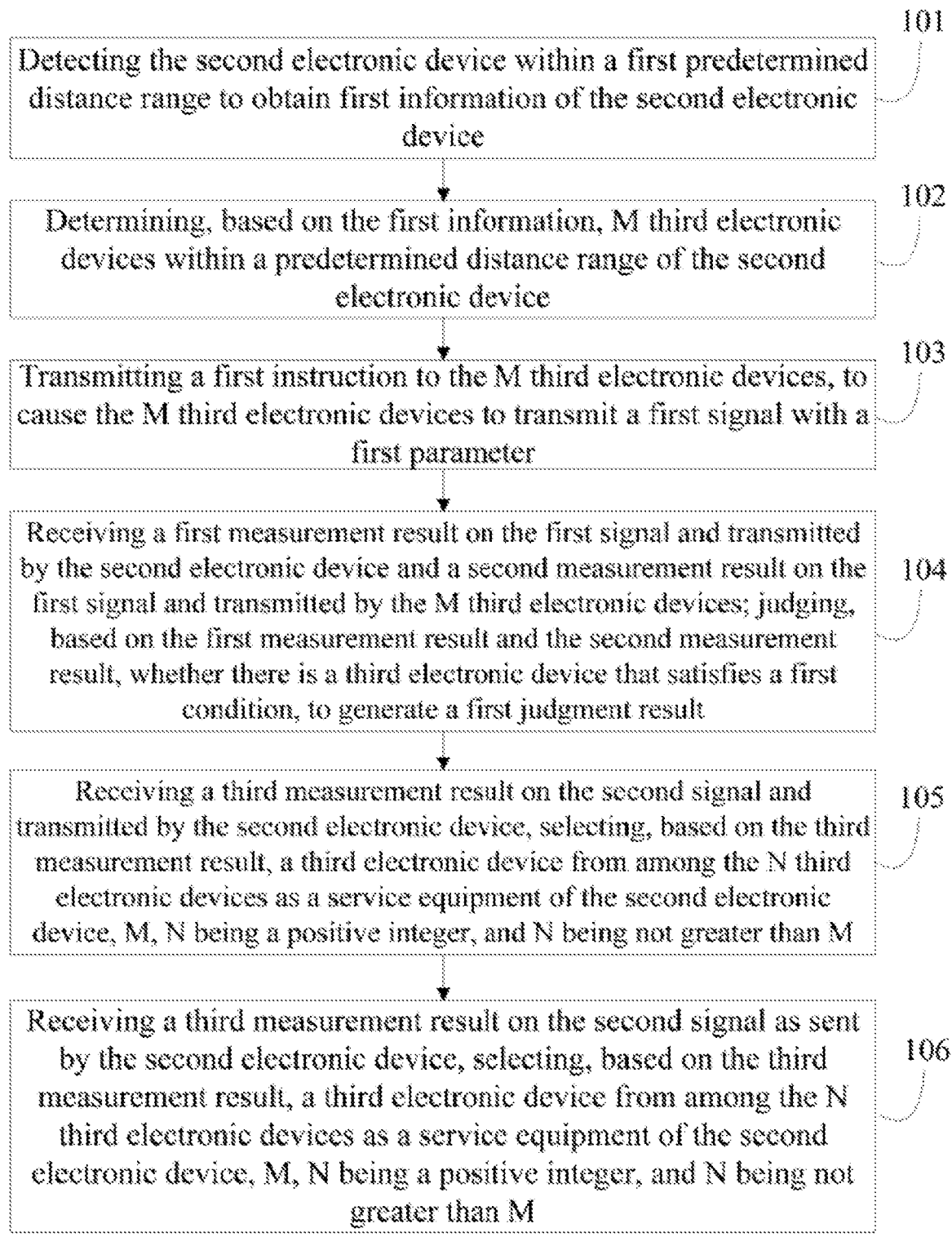
FIG. 1 is a flowchart of an information processing method according to a first embodiment of present disclosure.

Hereinafter, in order to more specifically understand the characteristics and technical contents of the present disclosure, implementations of the present disclosure will be described in detail with reference to the accompanying drawings, wherein the accompanying drawing are only for reference, rather than to limit the present disclosure FIG. 1 is a flowchart of an information processing method according to a first embodiment of present disclosure The information processing method in this embodiment is applied to an electronic device capable of communicating with a second electronic device, the electronic device and the second electronic device are capable of communicating with a third electronic device The electronic device especially refers to a Macro Base Station, which can be a base station of any wireless communication system; the second electronic device especially refers to a mobile terminal capable of accessing a wireless communication system through the electronic device; the third electronic device especially refers to a Small Cell Base Station, which is distributed within a coverage of the electronic device and is controlled by the electronic device As shown in FIG. 1, the information processing method in this embodiment comprises the following steps Step 101, detecting the second electronic device within a first predetermined distance range to obtain first information of the second electronic device The electronic device detects the second electronic device within its own coverage, determines the second electronic device that is turned on currently, and determines position information of the second electronic device In this step, the first information especially refers to the position information The predetermined distance range refers to a range in which the electronic device can receive a wireless signal transmitted by the second electronic device Step 102, determining, based on the first information, M third electronic devices within a predetermined distance range of the second electronic device.

When it is determined that a certain second electronic device needs to access a wireless communication network through a third electronic device, all the third electronic devices around the second electronic device are determined Here, the predetermined distance range refers to a range in which the second electronic device can detect a wireless signal transmitted by the third electronic devices.

Step 103, transmitting a first instruction to the M third electronic devices, to cause the M third electronic devices to transmit a first signal with a first parameter.

In this embodiment, after M third electronic devices around the second electronic device are determined, a Turn-On instruction is transmitted to them, to cause the M third electronic devices to transmit a Discovery Reference Signal (DRS), so that the second electronic device can measure the DRS transmitted by the third electronic devices. In this embodiment, the DRS is the same reference signal as the Cell-specific Reference Signal (CRS), just that a transmission period of the DRS is longer, usually the transmission power of a third electronic device is not high in a state of transmitting the DRS, in this way, the second electronic device can measure the DRS, the third electronic device can save energy, and it will not cause interference to the other third electronic devices and the Macro Base Station.

Step 104, receiving a first measurement result on the first signal and transmitted by the second electronic device and a second measurement result on the first signal and transmitted by the M third electronic devices; judging, based on the first measurement result and the second measurement result, whether there is a third electronic device that satisfies a first condition, to generate a first judgment result.

In this embodiment, the second measurement result is a measurement result detected by a third electronic device on the first signal transmitted by the other neighboring third electronic devices.

A signal measurement result detected by the second electronic device on each third electronic device among the M third electronic devices is obtained, and an interference measurement transmitted by each third electronic device among the M third electronic devices on the other third electronic devices is obtained, a third electronic device that has the highest signal strength and will not cause interference to the electronic device and the other turned-on third electronic devices.

Step 105, selecting, based on the first judgment result, N third electronic devices that satisfy the first condition, transmitting a second instruction to the N third electronic devices to cause the N third electronic devices to transmit a second signal with the first parameter.

N third electronic devices are selected based on the first measurement result on signal strength and transmitted by the second electronic device and the second measurement result on interference between cells and transmitted by the third electronic devices, a first signal transmission strength of the N third electronic devices satisfies an access requirement of the second electronic device, and will not cause interference to the other third electronic devices that are in an On state currently The electronic device transmits an instruction to the N third electronic devices, to cause the N third electronic devices to transmit a second signal with the power of transmitting the first signal Here, the second signal is CRS, that is, causing the N third electronic devices to transmit the CRS in a normal On state.

Step 106, receiving a third measurement result on the second signal and transmitted by the second electronic device, selecting, based on the third measurement result, a third electronic device from among the N third electronic devices as a service equipment of the second electronic device, M, N being a positive integer, and N being not greater than M.

The second electronic device measures the second signal transmitted by the N third electronic devices, the electronic device receives a third measurement result transmitted by the second electronic device, and selects a third electronic device with the highest signal strength from among the N third electronic devices as a service equipment of the second electronic device, notifies the second electronic device to access the wireless communication network through the selected third electronic device and start data communication.

Figure 2:
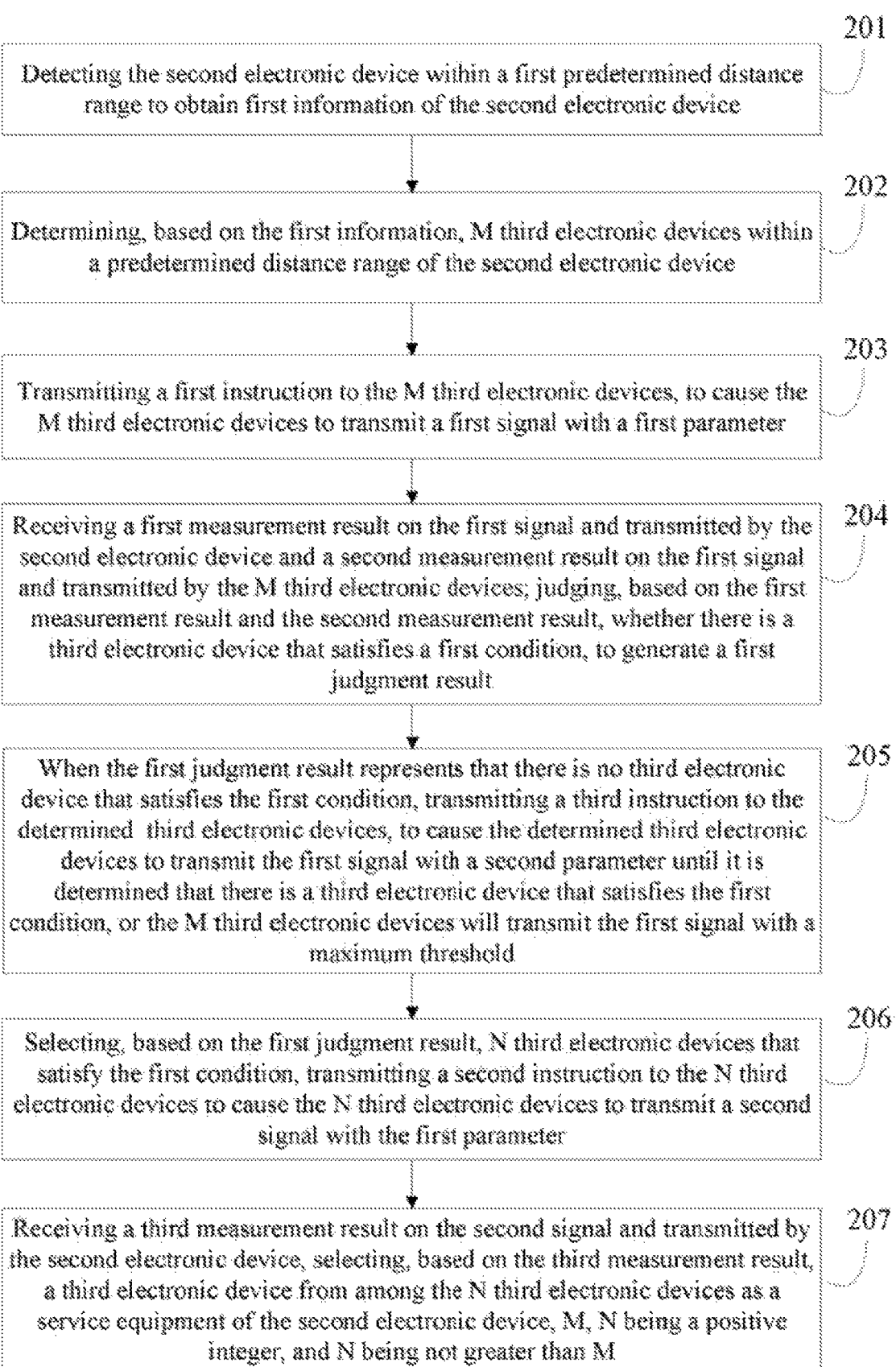
FIG. 2 is a flowchart of an information processing method according to a second embodiment of present disclosure.

FIG. 2 is a flowchart of an information processing method according to a second embodiment of present disclosure The information processing method in this embodiment is applied to an electronic device capable of communicating with a second electronic device, the electronic device and the second electronic device are capable of communicating with a third electronic device The electronic device especially refers to a Macro Base Station, which can be a base station of any wireless communication system; the second electronic device especially refers to a mobile terminal capable of accessing a wireless communication system through the electronic device; the third electronic device especially refers to a Small Cell Base Station, which is distributed within a coverage of the electronic device and is controlled by the electronic device As shown in FIG. 2, the information processing method in this embodiment comprises the following steps.

Step 201, detecting the second electronic device within a first predetermined distance range to obtain first information of the second electronic device The electronic device detects the second electronic device within its own coverage, determines the second electronic device that is turned on currently, and determines position information of the second electronic device In this step, the first information especially refers to the position information The predetermined distance range refers to a range in which the electronic device can receive a wireless signal transmitted by the second electronic device.

Step 202, determining, based on the first information, M third electronic devices within a predetermined distance range of the second electronic device.

When it is determined that a certain second electronic device needs to access a wireless communication network through a third electronic device, all the third electronic devices around the second electronic device are determined Here, the predetermined distance range refers to a range in which the second electronic device can detect a wireless signal transmitted by the third electronic devices.

Step 203, transmitting a first instruction to the M third electronic devices, to cause the M third electronic devices to transmit a first signal with a first parameter.

In this embodiment, after M third electronic devices around the second electronic device are determined, a Turn-On instruction is transmitted to them, to cause the M third electronic devices to transmit a Discovery Reference Signal (DRS), so that the second electronic device can measure the DRS transmitted by the third electronic devices In this embodiment, the DRS is the same reference signal as the Cell-specific Reference Signal (CRS), just that a transmission period of the DRS is longer, usually the transmission power of a third electronic device is not high in a state of transmitting the DRS, in this way, the second electronic device can measure the DRS, the third electronic device can save energy, and it will not cause interference to the other third electronic devices and the Macro Base Station.

Step 204, receiving a first measurement result on the first signal and transmitted by the second electronic device and a second measurement result on the first signal and transmitted by the M third electronic devices; judging, based on the first measurement result and the second measurement result, whether there is a third electronic device that satisfies a first condition, to generate a first judgment result.

In this embodiment, the second measurement result is a measurement result detected by a third electronic device on the first signal transmitted by the other neighboring third electronic devices.

A signal measurement result detected by the second electronic device on each third electronic device among the M third electronic devices is obtained, and an interference measurement transmitted by each third electronic device among the M third electronic devices on the other third electronic devices is obtained, a third electronic device that has the highest signal strength and will not cause interference to the electronic device and the other turned-on third electronic devices.

Step 205, when the first judgment result represents that there is no third electronic device that satisfies the first condition, transmitting a third instruction to the determined third electronic devices, to cause the determined third electronic devices to transmit the first signal with a second parameter; until it is determined that there is a third electronic device that satisfies the first condition, or the M third electronic devices transmit the first signal with a maximum threshold.

When the second electronic device does not find a third electronic device whose signal strength satisfies communication requirement, the electronic device notifies the third electronic devices around the second electronic device to increase their transmission power, and meanwhile it detects the signal measurement result transmitted by the second electronic device, until a third electronic device that satisfies the first condition is determined, or the M third electronic devices transmit the first signal with a maximum threshold.

A signal strength under the second parameter is greater than a signal strength under the first parameter.

Step 206, selecting, based on the first judgment result, N third electronic devices that satisfy the first condition, transmitting a second instruction to the N third electronic devices to cause the N third electronic devices to transmit a second signal with the first parameter.

N third electronic devices are selected based on the first measurement result on signal strength and transmitted by the second electronic device and the second measurement result on interference between cells and transmitted by the third electronic devices, a first signal transmission strength of the N third electronic devices satisfies an access requirement of the second electronic device, and will not cause interference to the other third electronic devices that are in an On state currently The electronic device transmits an instruction to the N third electronic devices, to cause the N third electronic devices to transmit a second signal with the power of transmitting the first signal Here, the second signal is CRS, that is, causing the N third electronic devices to transmit the CRS in a normal On state.

Step 207, receiving a third measurement result on the second signal and transmitted by the second electronic device, selecting, based on the third measurement result, a third electronic device from among the N third electronic devices as a service equipment of the second electronic device, M, N being a positive integer, and N being not greater than M.

The second electronic device measures the second signal transmitted by the N third electronic devices, the electronic device receives a third measurement result transmitted by the second electronic device, and selects a third electronic device with the highest signal strength from among the N third electronic devices as a service equipment of the second electronic device, notifies the second electronic device to access the wireless communication network through the selected third electronic device and start data communication.

Figure 3:
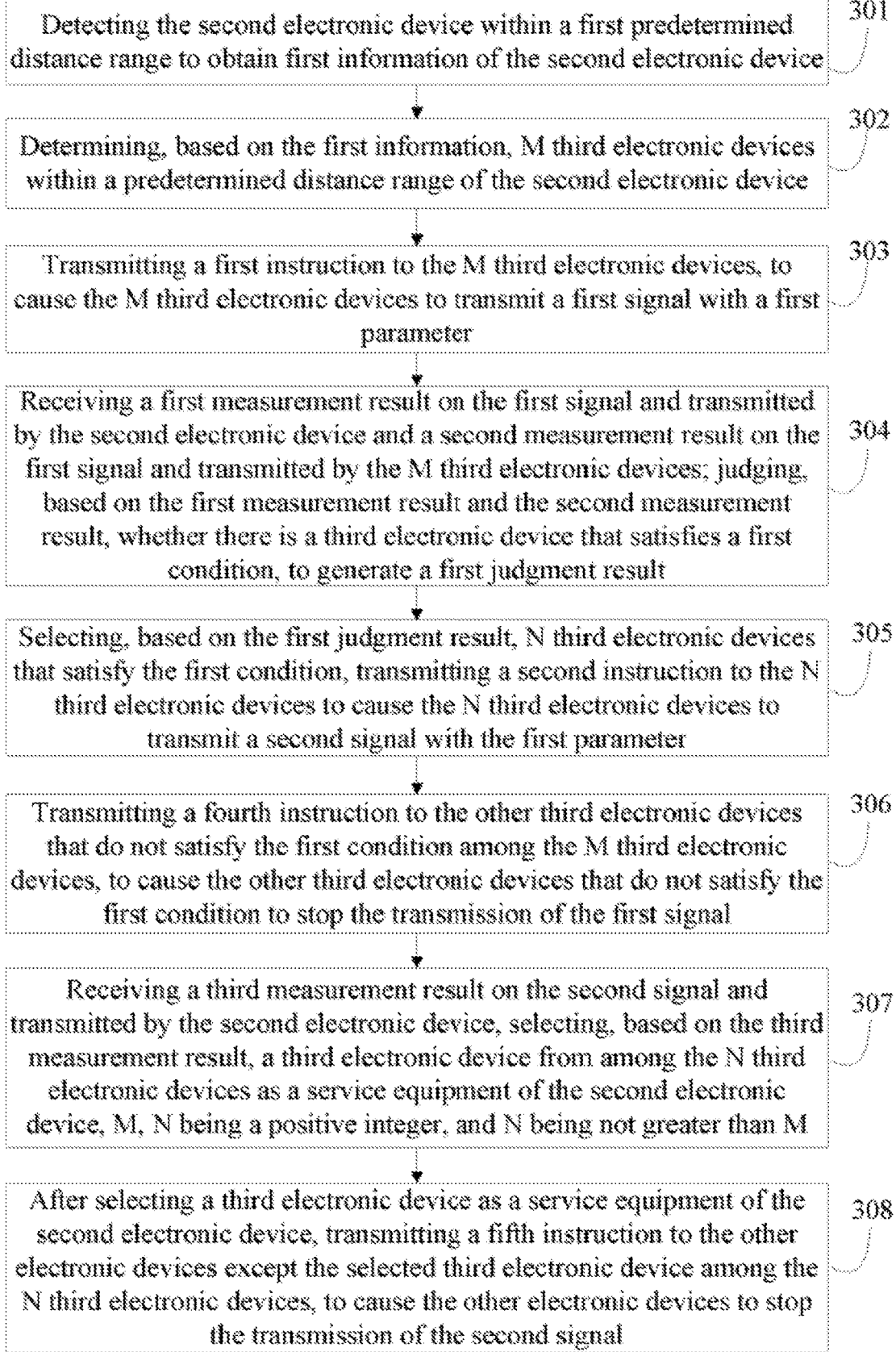
FIG. 3 is a flowchart of an information processing method according to a third embodiment of present disclosure.

FIG. 3 is a flowchart of an information processing method according to a third embodiment of present disclosure The information processing method in this embodiment is applied to an electronic device capable of communicating with a second electronic device, the electronic device and the second electronic device are capable of communicating with a third electronic device The electronic device especially refers to a Macro Base Station, which can be a base station of any wireless communication system; the second electronic device especially refers to a mobile terminal capable of accessing a wireless communication system through the electronic device; the third electronic device especially refers to a Small Cell Base Station, which is distributed within a coverage of the electronic device and is controlled by the electronic device As shown in FIG. 3, the information processing method in this embodiment comprises the following steps.

Step 301, detecting the second electronic device within a first predetermined distance range to obtain first information of the second electronic device.

The electronic device detects the second electronic device within its own coverage, determines the second electronic device that is turned on currently, and determines position information of the second electronic device In this step, the first information especially refers to the position information The predetermined distance range refers to a range in which the electronic device can receive a wireless signal transmitted by the second electronic device.

Step 302, determining, based on the first information, M third electronic devices within a predetermined distance range of the second electronic device.

When it is determined that a certain second electronic device needs to access a wireless communication network through a third electronic device, all the third electronic devices around the second electronic device are determined Here, the predetermined distance range refers to a range in which the second electronic device can detect a wireless signal transmitted by the third electronic devices.

Step 303, transmitting a first instruction to the M third electronic devices, to cause the M third electronic devices to transmit a first signal with a first parameter.

In this embodiment, after M third electronic devices around the second electronic device are determined, a Turn-On instruction is transmitted to them, to cause the M third electronic devices to transmit a Discovery Reference Signal (DRS), so that the second electronic device can measure the DRS transmitted by the third electronic devices In this embodiment, the DRS is the same reference signal as the Cell-specific Reference Signal (CRS), just that a transmission period of the DRS is longer, usually the transmission power of a third electronic device is not high in a state of transmitting the DRS, in this way, the second electronic device can measure the DRS, the third electronic device can save energy, and it will not cause interference to the other third electronic devices and the Macro Base Station.

Step 304, receiving a first measurement result on the first signal and transmitted by the second electronic device and a second measurement result on the first signal and transmitted by the M third electronic devices; judging, based on the first measurement result and the second measurement result, whether there is a third electronic device that satisfies a first condition, to generate a first judgment result In this embodiment, the second measurement result is a measurement result detected by a third electronic device on the first signal transmitted by the other neighboring third electronic devices.

A signal measurement result detected by the second electronic device on each third electronic device among the M third electronic devices is obtained, and an interference measurement transmitted by each third electronic device among the M third electronic devices on the other third electronic devices is obtained, a third electronic device that has the highest signal strength and will not cause interference to the electronic device and the other turned-on third electronic devices.

Step 305, selecting, based on the first judgment result, N third electronic devices that satisfy the first condition, transmitting a second instruction to the N third electronic devices to cause the N third electronic devices to transmit a second signal with the first parameter.

N third electronic devices are selected based on the first measurement result on signal strength and transmitted by the second electronic device and the second measurement result on interference between cells and transmitted by the third electronic devices, a first signal transmission strength of the N third electronic devices satisfies an access requirement of the second electronic device, and will not cause interference to the other third electronic devices that are in an On state currently The electronic device transmits an instruction to the N third electronic devices, to cause the N third electronic devices to transmit a second signal with the power of transmitting the first signal Here, the second signal is CRS, that is, causing the N third electronic devices to transmit the CRS in a normal On state.

Step 306, transmitting a fourth instruction to the other third electronic devices that do not satisfy the first condition among the M third electronic devices, to cause the other third electronic devices that do not satisfy the first condition to stop the transmission of the first signal.

After the third electronic device that satisfies the first condition is determined, a relevant instruction is to be transmitted to the other third electronic devices that do not satisfy the first condition, to cause the other third electronic devices that turn on the first signal to shut off their signal transmission, so unnecessary interface will not be caused to the other third electronic devices that in an On state or the Macro Base Station.

Step 307, receiving a third measurement result on the second signal and transmitted by the second electronic device, selecting, based on the third measurement result, a third electronic device from among the N third electronic devices as a service equipment of the second electronic device, M, N being a positive integer, and N being not greater than M.

The second electronic device measures the second signal transmitted by the N third electronic devices, the electronic device receives a third measurement result transmitted by the second electronic device, and selects a third electronic device with the highest signal strength from among the N third electronic devices as a service equipment of the second electronic device, notifies the second electronic device to access the wireless communication network through the selected third electronic device and start data communication.

Step 308, after selecting a third electronic device as a service equipment of the second electronic device, transmitting a fifth instruction to the other electronic devices except the selected third electronic device among the N third electronic devices, to cause the other electronic devices to stop the transmission of the second signal.

After the third electronic device that satisfies the communication requirement of the second electronic device is determined, a relevant instruction is to be transmitted to the other third electronic devices that do not satisfy the communication requirement, to cause the other third electronic devices that turn on the second signal to shut off their signal transmission, so unnecessary interface will not be caused to the other third electronic devices that in an On state or the Macro Base Station FIG. 4 is a flowchart of an information processing method according to a fourth embodiment of present disclosure The information processing method in this embodiment is applied to an electronic device capable of communicating with a second electronic device, the electronic device and the second electronic device are capable of communicating with a third electronic device The electronic device especially refers to a Macro Base Station, which can be a base station of any wireless communication system; the second electronic device especially refers to a mobile terminal capable of accessing a wireless communication system through the electronic device; the third electronic device especially refers to a Small Cell Base Station, which is distributed within a coverage of the electronic device and is controlled by the electronic device As shown in FIG. 4, the information processing method in this embodiment comprises the following steps.

Step 401, determining whether there are Q third electronic devices that transmit the second signal among the M third electronic devices within the predetermined distance range of the second electronic device, if yes, receiving a fourth measurement result on the second signal of the Q third electronic devices and transmitted by the second electronic device.

In this embodiment, the electronic device directly determines whether there is a third electronic device that directly transmits the CRS within the region where the second electronic device resides, and the wireless signal of the third electronic device that transmits the CRS can cover the second electronic device, when there is such a third electronic device, a measurement result detected by the second electronic device on strength of the CRS signal transmitted by such third electronic device, and a third electronic device that transmits the CRS and satisfies a signal strength is selected based on the measurement result.

It should be noted that when there is no the third electronic device that transmits the second signal around the second electronic device, then relevant processing flows in the above first to third embodiments will be started.

Step 402, selecting, based on the fourth measurement result, a third electronic device that satisfies a second condition from among the Q third electronic devices, taking the selected third electronic device as a service equipment of the second electronic device.

A third electronic device with the highest signal strength among the Q third electronic device is selected as the service equipment of the second electronic device, and the second electronic device is notified of accessing the wireless communication network through the selected third electronic device for starting data communication.

FIG. 5 is a flowchart of an information processing method according to a fifth embodiment of present disclosure The information processing method in this embodiment is applied to an electronic device capable of communicating with a second electronic device, the electronic device and the second electronic device are capable of communicating with a third electronic device The electronic device especially refers to a Macro Base Station, which can be a base station of any wireless communication system; the second electronic device especially refers to a mobile terminal capable of accessing a wireless communication system through the electronic device; the third electronic device especially refers to a Small Cell Base Station, which is distributed within a coverage of the electronic device and is controlled by the electronic device As shown in FIG. 5, the information processing method in this embodiment comprises the following steps.

Step 501, determining whether there are Q third electronic devices that transmit the second signal among the M third electronic devices within the predetermined distance range of the second electronic device, if yes, receiving a fourth measurement result on the second signal of the Q third electronic devices and transmitted by the second electronic device.

In this embodiment, the electronic device directly determines whether there is a third electronic device that directly transmits the CRS within the region where the second electronic device resides, and the wireless signal of the third electronic device that transmits the CRS can cover the second electronic device, when there is such a third electronic device, a measurement result detected by the second electronic device on strength of the CRS signal transmitted by such third electronic device, and a third electronic device that transmits the CRS and satisfies a signal strength is selected based on the measurement result.

It should be noted that when there is no the third electronic device that transmits the second signal around the second electronic device, then relevant processing flows in the above first to third embodiments will be started.

Step 502, when it is determined based on the fourth measurement result that none of the Q third electronic devices satisfies the second condition, transmitting a sixth instruction to the Q third electronic devices, so that the Q third electronic devices transmit the second signal with a signal strength having an increased corresponding value; until it is determined that that is a third electronic device that satisfies the second condition, or the Q third electronic devices transmit the second signal with a maximum threshold.

When it is determined that there are third electronic devices that transmit the second signal around the second electronic device, but none of them satisfies the requirement on signal strength, a relevant instruction is transmitted to these third electronic devices, to cause them to increase their transmission power, and it is further detected whether there is a third electronic device that satisfies the signal strength for the second electronic device to access, until a third electronic device whose signal strength arrives at the access requirement of the second electronic device, or the Q third electronic devices transmit the second signal with a maximum threshold.

Step 503, selecting, based on the fourth measurement result, a third electronic device that satisfies a second condition from among the Q third electronic devices, taking the selected third electronic device as a service equipment of the second electronic device.

A third electronic device with the highest signal strength among the Q third electronic device is selected as the service equipment of the second electronic device, and the second electronic device is notified of accessing the wireless communication network through the selected third electronic device for starting data communication.

Figure 6:
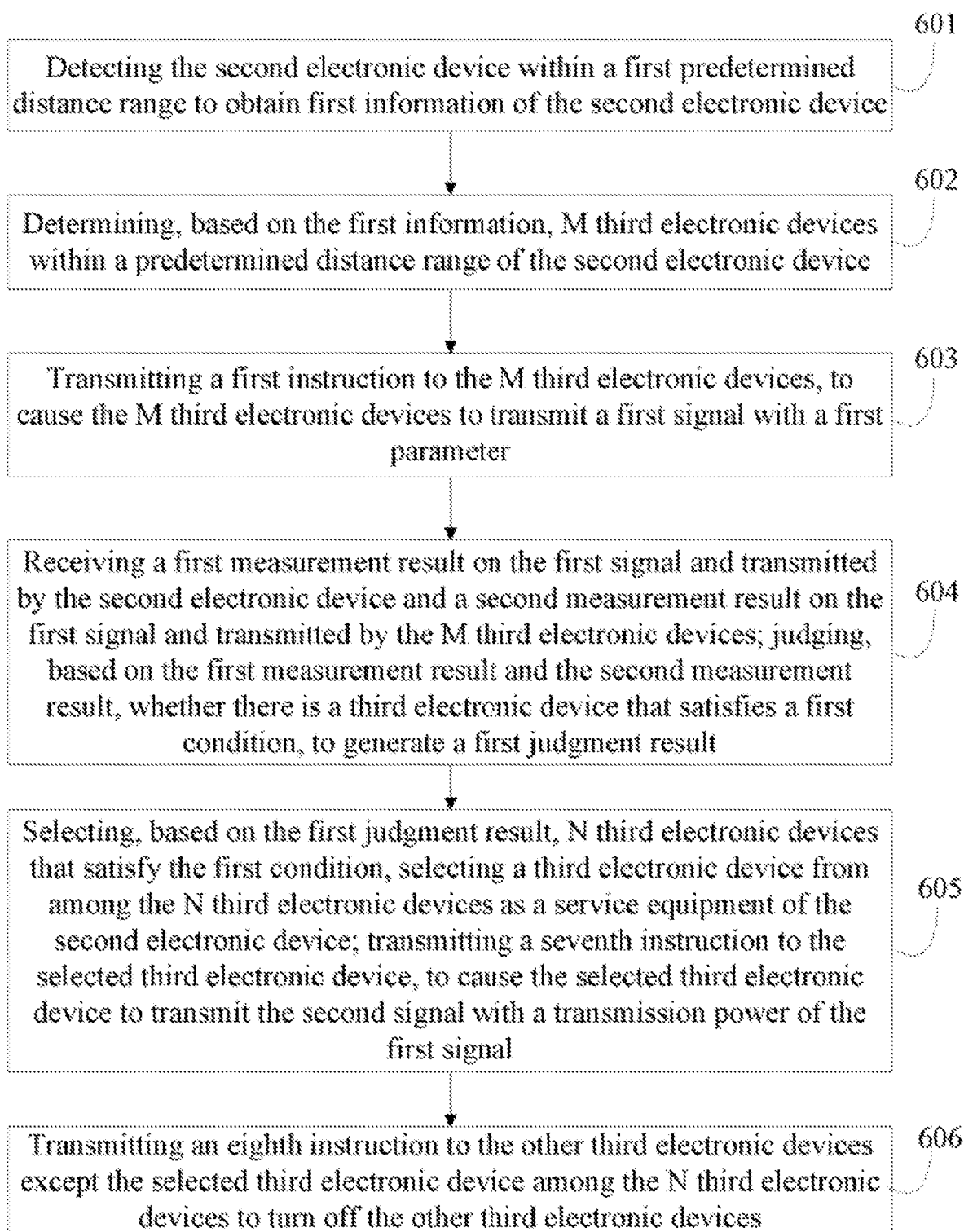
FIG. 6 is a flowchart of an information processing method according to a sixth embodiment of present disclosure.

FIG. 6 is a flowchart of an information processing method according to a sixth embodiment of present disclosure The information processing method in this embodiment is applied to an electronic device capable of communicating with a second electronic device, the electronic device and the second electronic device are capable of communicating with a third electronic device The electronic device especially refers to a Macro Base Station, which can be a base station of any wireless communication system; the second electronic device especially refers to a mobile terminal capable of accessing a wireless communication system through the electronic device; the third electronic device especially refers to a Small Cell Base Station, which is distributed within a coverage of the electronic device and is controlled by the electronic device As shown in FIG. 6, the information processing method in this embodiment comprises the following steps.

Step 601, detecting the second electronic device within a first predetermined distance range to obtain first information of the second electronic device.

The electronic device detects the second electronic device within its own coverage, determines the second electronic device that is turned on currently, and determines position information of the second electronic device In this step, the first information especially refers to the position information The predetermined distance range refers to a range in which the electronic device can receive a wireless signal transmitted by the second electronic device.

Step 602, determining, based on the first information, M third electronic devices within a predetermined distance range of the second electronic device.

When it is determined that a certain second electronic device needs to access a wireless communication network through a third electronic device, all the third electronic devices around the second electronic device are determined Here, the predetermined distance range refers to a range in which the second electronic device can detect a wireless signal transmitted by the third electronic devices.

Step 603, transmitting a first instruction to the M third electronic devices, to cause the M third electronic devices to transmit a first signal with a first parameter.

In this embodiment, after M third electronic devices around the second electronic device are determined, a Turn-On instruction is transmitted to them, to cause the M third electronic devices to transmit a Discovery Reference Signal (DRS), so that the second electronic device can measure the DRS transmitted by the third electronic devices In this embodiment, the DRS is the same reference signal as the Cell-specific Reference Signal (CRS), just that a transmission period of the DRS is longer, usually the transmission power of a third electronic device is not high in a state of transmitting the DRS, in this way, the second electronic device can measure the DRS, the third electronic device can save energy, and it will not cause interference to the other third electronic devices and the Macro Base Station.

Step 604, receiving a first measurement result on the first signal and transmitted by the second electronic device and a second measurement result on the first signal and transmitted by the M third electronic devices; judging, based on the first measurement result and the second measurement result, whether there is a third electronic device that satisfies a first condition, to generate a first judgment result.

In this embodiment, the second measurement result is a measurement result detected by a third electronic device on the first signal transmitted by the other neighboring third electronic devices.

A signal measurement result detected by the second electronic device on each third electronic device among the M third electronic devices is obtained, and an interference measurement transmitted by each third electronic device among the M third electronic devices on the other third electronic devices is obtained, a third electronic device that has the highest signal strength and will not cause interference to the electronic device and the other turned-on third electronic devices.

Step 605, selecting, based on the first judgment result, N third electronic devices that satisfy the first condition, selecting a third electronic device from among the N third electronic devices as a service equipment of the second electronic device; transmitting a seventh instruction to the selected third electronic device, to cause the selected third electronic device to transmit the second signal with a transmission power of transmitting the first signal.

N third electronic devices are selected based on the first measurement result on signal strength and transmitted by the second electronic device and the second measurement result on interference between cells and transmitted by the third electronic devices, a first signal transmission strength of the N third electronic devices satisfies an access requirement of the second electronic device, and will not cause interference to the other third electronic devices that are in an On state currently In this embodiment, when the third electronic devices that satisfy the first condition are determined, one third electronic device is directly determined from the N third electronic devices as a service equipment of the second electronic device, that is, it is possible to select, from among the N third electronic devices, one third electronic device with the highest signal strength with respect to the second electronic device, and transmit an instruction to the selected third electronic device, to cause the selected third electronic device to directly transmit the second signal with the transmission power of currently transmitting the first signal Here, the second signal is CRS, that is, causing the selected third electronic device to transmit the CRS in a normal On state.

Step 606, transmitting an eighth instruction to the other third electronic devices except the selected third electronic device among the N third electronic devices to turn off the other third electronic devices.

After the third electronic device that satisfies the communication requirement is selected, an instruction is transmitted to the other third electronic devices that transmit the second signal to cause the other third electronic devices to stop the transmission of the second signal.

An embodiment of the present disclosure further discloses an information processing method applied to an electronic device capable of communicating with a first electronic device, wherein the information processing method comprises:

receiving a first instruction from the first electronic device, to transmit a first signal with a first parameter;

receiving a second instruction from the first electronic device, to transmit the first signal with a second parameter;

receiving a third instruction from the first electronic device, to stop the transmission of the first signal;

receiving a fourth instruction from the first electronic device, transmit a second signal with a fourth parameter;

receiving a fifth instruction from the first electronic device, to transmit the second signal with a fifth parameter;

receiving a sixth instruction from the first electronic device, to stop the transmission of the second signal;

wherein a signal strength under the second parameter is greater than a signal strength under the first parameter;

a signal strength under the fifth parameter is greater than a signal strength under the fourth parameter.

In this embodiment of the present disclosure, after the electronic device transmits the first signal, it further measures the first signal transmitted by the other electronic device around the electronic device, and generates a measurement result.

The measurement result is transmitted to the first electronic device.

That is to say, the Small Cell Base Station receives an instruction from the Macro Base Station, to turn on the Small Cell Base Station and transmit the first signal or the second signal with corresponding transmission power, wherein the first signal refers to the DRS, and the second signal refers to the CRS.

Figure 7:
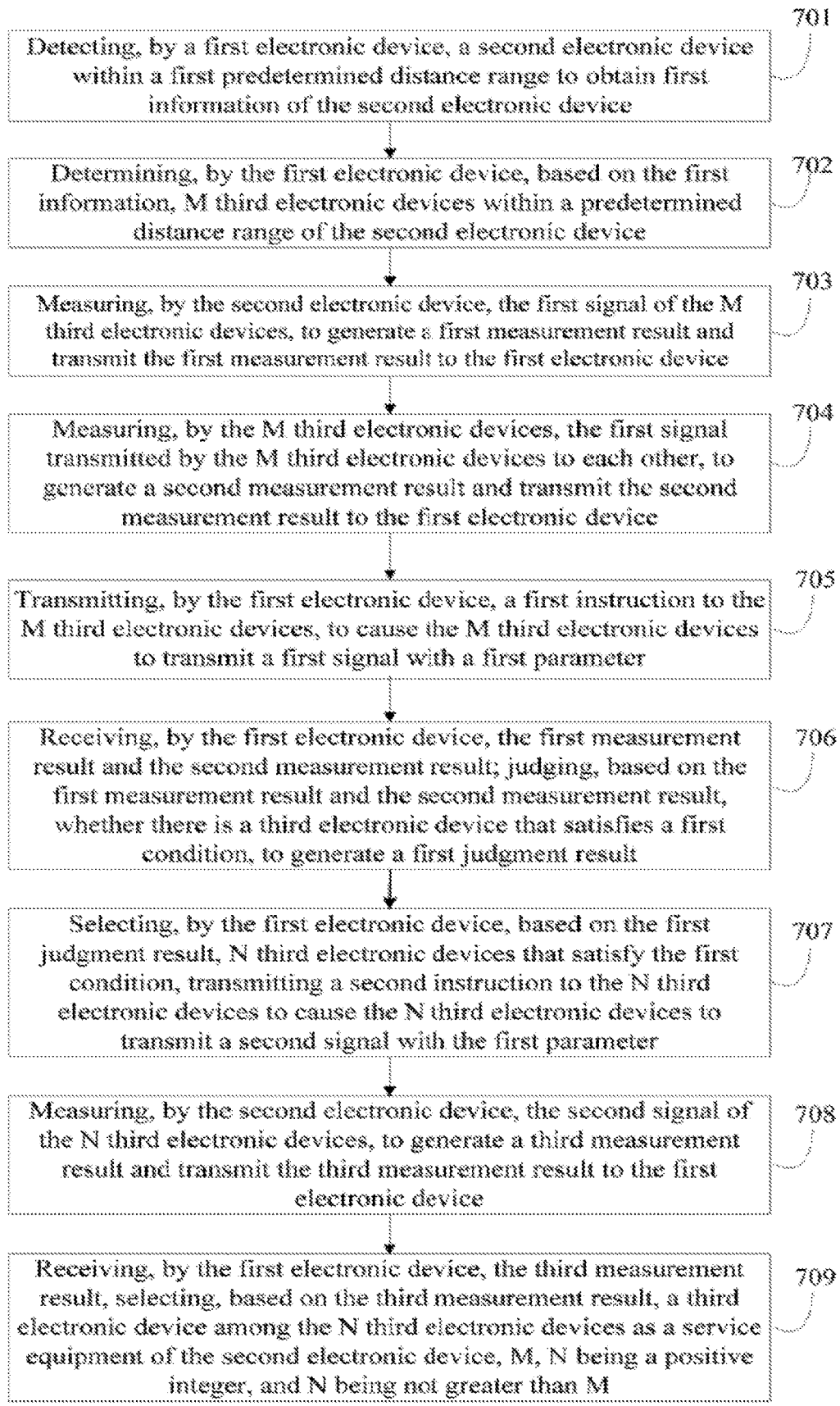
FIG. 7 is a flowchart of an information processing method according to a seventh embodiment of present disclosure.

FIG. 7 is a flowchart of an information processing method according to a seventh embodiment of present disclosure The information processing method in this embodiment is applied to an electronic device capable of communicating with a second electronic device, the electronic device and the second electronic device are capable of communicating with a third electronic device The electronic device especially refers to a Macro Base Station, which can be a base station of any wireless communication system; the second electronic device especially refers to a mobile terminal capable of accessing a wireless communication system through the electronic device; the third electronic device especially refers to a Small Cell Base Station, which is distributed within a coverage of the electronic device and is controlled by the electronic device As shown in FIG. 7, the information processing method in this embodiment comprises the following steps.

Step 701, detecting, by a first electronic device, a second electronic device within a first predetermined distance range to obtain first information of the second electronic device:

The second electronic device monitors a wireless signal transmitted by the base station side in real time, and transmits a measurement result on the wireless signal to the base station side The first electronic device can determine the second electronic device based on the measurement result transmitted by the second electronic device.

The first electronic device detects the second electronic device within its own coverage, determines the second electronic device that is turned on currently, and determines position information of the second electronic device In this step, the first information especially refers to the position information The predetermined distance range refers to a range in which the electronic device can receive a wireless signal transmitted by the second electronic device.

Step 702, determining, by the first electronic device, based on the first information, M third electronic devices within a predetermined distance range of the second electronic device When it is determined that a certain second electronic device needs to access a wireless communication network through a third electronic device, all the third electronic devices around the second electronic device are determined Here, the predetermined distance range refers to a range in which the second electronic device can detect a wireless signal transmitted by the third electronic devices.

Step 703, measuring, by the second electronic device, the first signal of the M third electronic devices, to generate a first measurement result and transmit the first measurement result to the first electronic device.

Step 704, measuring, by the M third electronic devices, the first signal transmitted by the M third electronic devices to each other, to generate a second measurement result and transmit the second measurement result to the first electronic device;

In this embodiment, the second measurement result is a measurement result detected by a third electronic device on the first signal transmitted by the other neighboring third electronic devices.

In this embodiment, steps 703 and 704 have no sequence of priority, they may proceed in parallel.

Step 705, transmitting, by the first electronic device, a first instruction to the M third electronic devices, to cause the M third electronic devices to transmit a first signal with a first parameter.

In this embodiment, after M third electronic devices around the second electronic device are determined, a Turn-On instruction is transmitted to them, to cause the M third electronic devices to transmit a Discovery Reference Signal (DRS), so that the second electronic device can measure the DRS transmitted by the third electronic devices In this embodiment, the DRS is the same reference signal as the Cell-specific Reference Signal (CRS), just that a transmission period of the DRS is longer, usually the transmission power of a third electronic device is not high in a state of transmitting the DRS, in this way, the second electronic device can measure the DRS, the third electronic device can save energy, and it will not cause interference to the other third electronic devices and the Macro Base Station.

Step 706, receiving, by the first electronic device, the first measurement result and the second measurement result; judging, based on the first measurement result and the second measurement result, whether there is a third electronic device that satisfies a first condition, to generate a first judgment result.

Signal measurement result detected by the second electronic device on each third electronic device among the M third electronic devices is obtained, and an interference measurement transmitted by each third electronic device among the M third electronic devices on the other third electronic devices is obtained, a third electronic device that has the highest signal strength and will not cause interference to the electronic device and the other turned-on third electronic devices In this embodiment, the first condition refers to the highest signal strength with respect to the second electronic device and will not cause interference to the electronic device and the other turned-on third electronic devices.

Step 707, selecting, by the first electronic device, based on the first judgment result, N third electronic devices that satisfy the first condition, transmitting a second instruction to the N third electronic devices to cause the N third electronic devices to transmit a second signal with the first parameter.

N third electronic devices are selected based on the first measurement result on signal strength and transmitted by the second electronic device and the second measurement result on interference between cells and transmitted by the third electronic devices, a first signal transmission strength of the N third electronic devices satisfies an access requirement of the second electronic device, and will not cause interference to the other third electronic devices that are in an On state currently The electronic device transmits an instruction to the N third electronic devices, to cause the N third electronic devices to transmit a second signal with the power of transmitting the first signal Here, the second signal is CRS, that is, causing the N third electronic devices to transmit the CRS in a normal On state.

Step 708, measuring, by the second electronic device, the second signal of the N third electronic devices, to generate a third measurement result and transmit the third measurement result to the first electronic device.

Step 709, receiving, by the first electronic device, the third measurement result, selecting, based on the third measurement result, a third electronic device among the N third electronic devices as a service equipment of the second electronic device, M, N being a positive integer, and N being not greater than M.

The second electronic device measures the second signal transmitted by the N third electronic devices, the electronic device receives a third measurement result transmitted by the second electronic device, and selects a third electronic device with the highest signal strength from among the N third electronic devices as a service equipment of the second electronic device, notifies the second electronic device to access the wireless communication network through the selected third electronic device and start data communication.

Hereinafter, the substance of the technical solutions of the embodiments of the present disclosure will be further explained through specific examples.

The embodiments of the present disclosure are applicable to the Non-standalone Small Cell controlled by a Base Station After the Non-standalone Small Cell is deployed, Discovery RS (DRS) is introduced, the cycle of each DRS is 40 ms, its emergence position is distributed by a Macro Base Station in different 1 ms sub-frames based on a different Small Cell, the signal transmitted by the Small Cell may be divided into three states as follows:

On-state: like a Macro Cell, transmitting conventional reference signals such as PSS, SSS, CRS and physical channels such as PBCH, PDCCH, and PDSCH; a protocol layer monitors a control command transmitted by the Macro Base Station through X2-C.

Off-state: the Small Cell does not transmit any signal under this state, meanwhile a protocol layer monitors a control command transmitted by the Macro Base Station through X2-C Dormant-state: the Small Cell only transmits the DRS signal periodically under this state, without transmitting any conventional reference signal, meanwhile a protocol layer monitors a control command transmitted by the Macro Base Station through X2-C.

A state shift of the Small Cell is controlled completely by the Macro Base Station, after the UC ends the RRC connection, it cannot reside in the Non-standalone Small Cell.

When the Macro Base Station detects and finds out that the capability of the connected UE supports carrier aggregation, dual-link, or the load of the Macro Base Station enters a cardoon, then the Macro Base Station turns on the Non-standalone Cell by the following steps.

1 The Macro Base Station controls the UE Small Cell that may be covered by multiple subordinate signals to enter a Dormant state (if the Small Cell is in an On state, then it remains unchanged), meanwhile specifying the transmission power of the Small Cell, if is an already-turned-on Small Cell, its transmission power remains unchanged.

2 The Macro Base Station transmits, through an RRC message, a serial number that specifies the Discovery RS signal of a sub-frame and a sub-frame position of the signal to the UE, and notifies the UE to asynchronously measure the Discovery RS signal, after the UE completes the measurement, it reports the measured RSRP to the Macro Base Station; meanwhile, the Macro Base Station notifies a relevant Small Cell to perform a co-frequency interference measurement, and reports the measurement result to the Macro Base Station.

3 The Macro Base Station selects, based on RSRP measured by the UE on the Discovery RS and the result of co-frequency interference measurement between Small Cells, several suitable Small Cells, standards for the selection are:

the signal strength of receiving Discovery RS (RSRP) measured by the UE is larger than −110 dBm and the strength of co-frequency interference measured by the Small Cell is less than −150 dBm; a Small Cell that satisfies the aforesaid condition is called a suitable Small Cell 4 If there is no Small Cell that satisfies the aforesaid condition, the transmission power of the Small Cell that is in a dormant state is changed (ie, increasing the transmission power), until a suitable Small Cell is selected; in this way, the transmission power of all candidate Small Cells is specified, and will not change after being turned on.

5 The Macro Base Station turns on the Small Cell that is in a dormant state and is a suitable Small Cell, and turns off the non-suitable Small Cell that is not selected, thus the first stage of DRS signal measurement is completed.

6 The Macro Base Station notifies the UE to measure the RSRP of the Cell-specific RS of the Small Cell that is turned on, and reports the measurement report to the Macro Base Station; the Macro Base Station selects one best (e.g., optimal) Small Cell based on the following rule:

The rule for the best Small Cell may include that the RSRP of the Cell-specific RS of the Small Cell that is turned on is the largest.

7 Turning off the Small Cell that is not selected and switches from the dormant state to the On state during the first stage, only one best Small Cell is retained 8 According to specific cases of the user: comprising the Macro Base Station and the Small Cell will form a carrier aggregation, or form a dual direction, or the Macro Base Station will switch to the Small Cell The specific protocol process is exactly the same as that from a Macro Cell to a Macro Cell.

9 After the UE ends the RRC connection, it cannot reside in the Small Cell, but must return and reside in the Macro Base Station When all the UEs in the Small Cell end the RRC connection, the Macro Base Station turns off the Small Cell.

Figure 8:
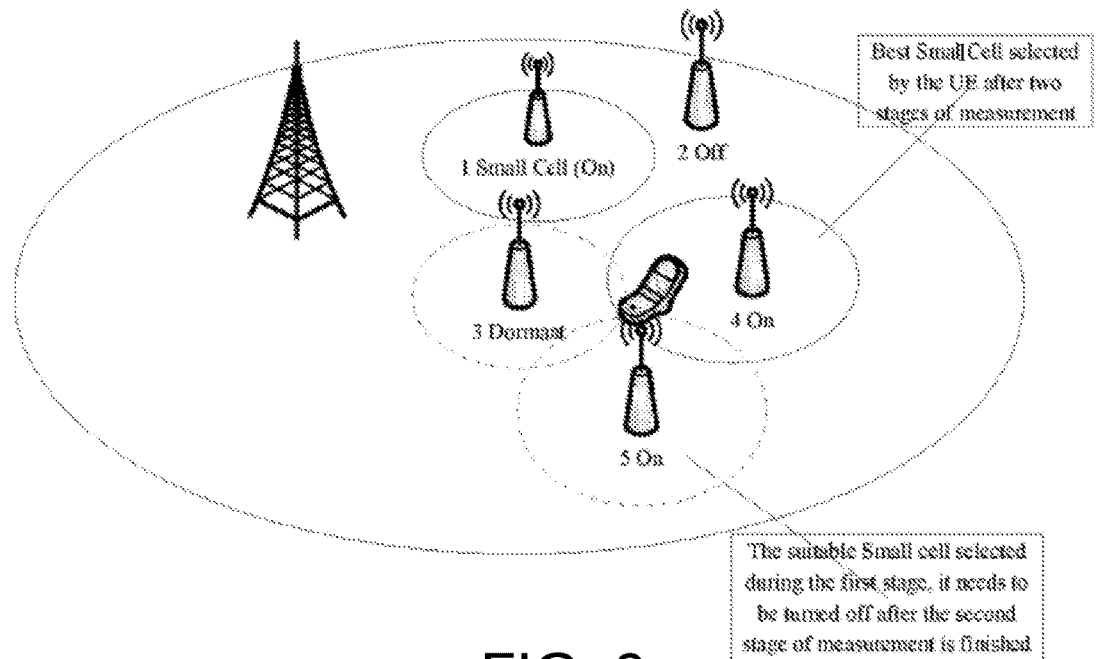
FIG. 8 is s schematic diagram of disclosure of an information processing method according to an embodiment of the present disclosure.
Figure 9:
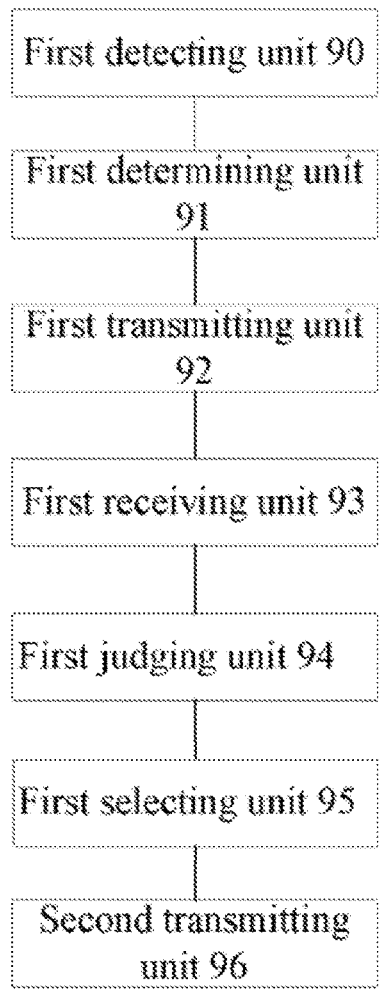
FIG. 9 is a schematic diagram of a structure of an electronic device according to the first embodiment of the present disclosure.

As shown in FIG. 8, the UE and the Macro Base Station form a normal RRC connection, when the Macro Base Station finds out that its load enters a cordon, it needs to move the UE in a Small Cell, the Macro Base Station judges, based on the physical position of the UE, Small Cells 3, 4, 5 may become a suitable Small Cell for the UE, Small Cells 3, 4, 5 are all in an Off state, Small Cell 1 is in an On state because of being connected by the other UE. A first stage of selection of a group of suitable Small Cell: Small Cells 3, 4, 5 enter a dormant state under the instruction of the Macro Base Station and transmit the Discovery RS signal, the UE measures the Discovery RS signal of Small Cells 3, 4, 5, meanwhile Small Cell 3, 4, 5 measure the co-frequency interference which it is subjected to The result is: the signal strength (RSRP) received by the UE is: Small Cell 3>Small Cell 4>Small Cell 5, but none of them exceeds −110 dBm, but since Small Cell 3 gets co-frequency interference from Small Cell 1, and the interference strength exceeds −150 dBm, Small Cell 3 is excluded from being a suitable Small Cell, and therefore is turned off In this way, Small Cells 4, 5 become a group of suitable Small Cell A second stage of selection of the best Small Cell: the Macro Base Station turns on Small Cells 4 and 5 completely, the UE measures the Cell-specific RS signal of Small Cells 4 and 5, to obtain the most reliable reception signal strength, with a result as below: Small Cell 4>Small Cell 5 Finally, Small Cell 4 is selected as the best Small Cell, Small Cell 5 is turned off The UE is switched to Small Cell 4, which reduces the load of the Macro Base Station FIG. 9 is a schematic diagram of structure of an electronic device according to the first embodiment of the present disclosure As shown in FIG. 9, the electronic device is capable of communicating with a second electronic device, the electronic device and the second electronic device are capable of communicating with a third electronic device, wherein the electronic device comprises a first detecting unit 90, a first determining unit 91, a first transmitting unit 92, a first receiving unit 93, a first judging unit 94, a first selecting unit 95, and a second transmitting unit 96:

the first detecting unit 90 is configured to detect the second electronic device within a first predetermined distance range to obtain first information of the second electronic device;

the first determining unit 91 is configured to determine, based on the first information, M third electronic devices within a predetermined distance range of the second electronic device;

the first transmitting unit 92 is configured to transmit a first instruction to the M third electronic devices, to cause the M third electronic devices to transmit a first signal with a first parameter;

the first receiving unit 93 is configured to receive a first measurement result on the first signal and transmitted by the second electronic device and a second measurement result on the first signal and transmitted by the M third electronic devices;

in this embodiment, the second measurement result is a measurement result detected by a third electronic device on the first signal transmitted by the other neighboring third electronic devices;

the first judging unit 94 is configured to judge, based on the first measurement result and the second measurement result, whether there is a third electronic device that satisfies a first condition, to generate a first judgment result;

the first selecting unit 95 is configured to select, based on the first judgment result, N third electronic devices that satisfy the first condition; and the second transmitting unit 96 is configured to transmit a second instruction to the N third electronic devices to cause the N third electronic devices to transmit a second signal with the first parameter.

Based on the electronic device shown in FIG. 9, the electronic device according to an embodiment of the present disclosure further comprise a second receiving unit (not shown in FIG. 9) and a second selecting unit (not shown in FIG. 9):

the second receiving unit is configured to receive a third measurement result on the second signal and transmitted by the second electronic device;

the second selecting unit is configured to select, based on the third measurement result, a third electronic device from among the N third electronic devices as a service equipment of the second electronic device, M, N being a positive integer, and N being not greater than M Based on the electronic device shown in FIG. 9, the electronic device according to an embodiment of the present disclosure further comprises:

a third transmitting unit (not shown in FIG. 9) configured to, when the first judgment result represents that there is no third electronic device that satisfies the first condition, send a third instruction to the determined third electronic devices, to cause the determined third electronic devices to transmit the first signal with a second parameter;

until it is determined that there is a third electronic device that satisfies the first condition, or the M third electronic devices transmit the first signal with a maximum threshold; wherein a signal strength under the second parameter is greater than a signal strength under the first parameter.

Based on the electronic device shown in FIG. 9, the electronic device according to an embodiment of the present disclosure further comprise a fourth transmitting unit (not shown in FIG. 9) and a fifth transmitting unit (not shown in FIG. 9):

the fourth transmitting unit is configured to send a fourth instruction to the other third electronic devices that do not satisfy the first condition among the M third electronic devices, to cause the other third electronic devices that do not satisfy the first condition to stop the transmission of the first signal;

the fifth transmitting unit is configured to, after selecting a third electronic device as a service equipment of the second electronic device, send a fifth instruction to the other electronic devices except the selected third electronic device among the N third electronic devices, to cause the other electronic devices to stop the transmission of the second signal.

As will be appreciated by those skilled in the art, the functions achieved by respective units in the electronic devices shown in FIG. 9 may be understood by making reference to the information processing method described above in the first to seventh embodiments and the related description of the example shown in FIG. 8 The functions of the respective units in the electronic device in FIG. 9 may be implemented by programs running on a processor, and may also be implemented by specific logic circuits.

Figure 10:
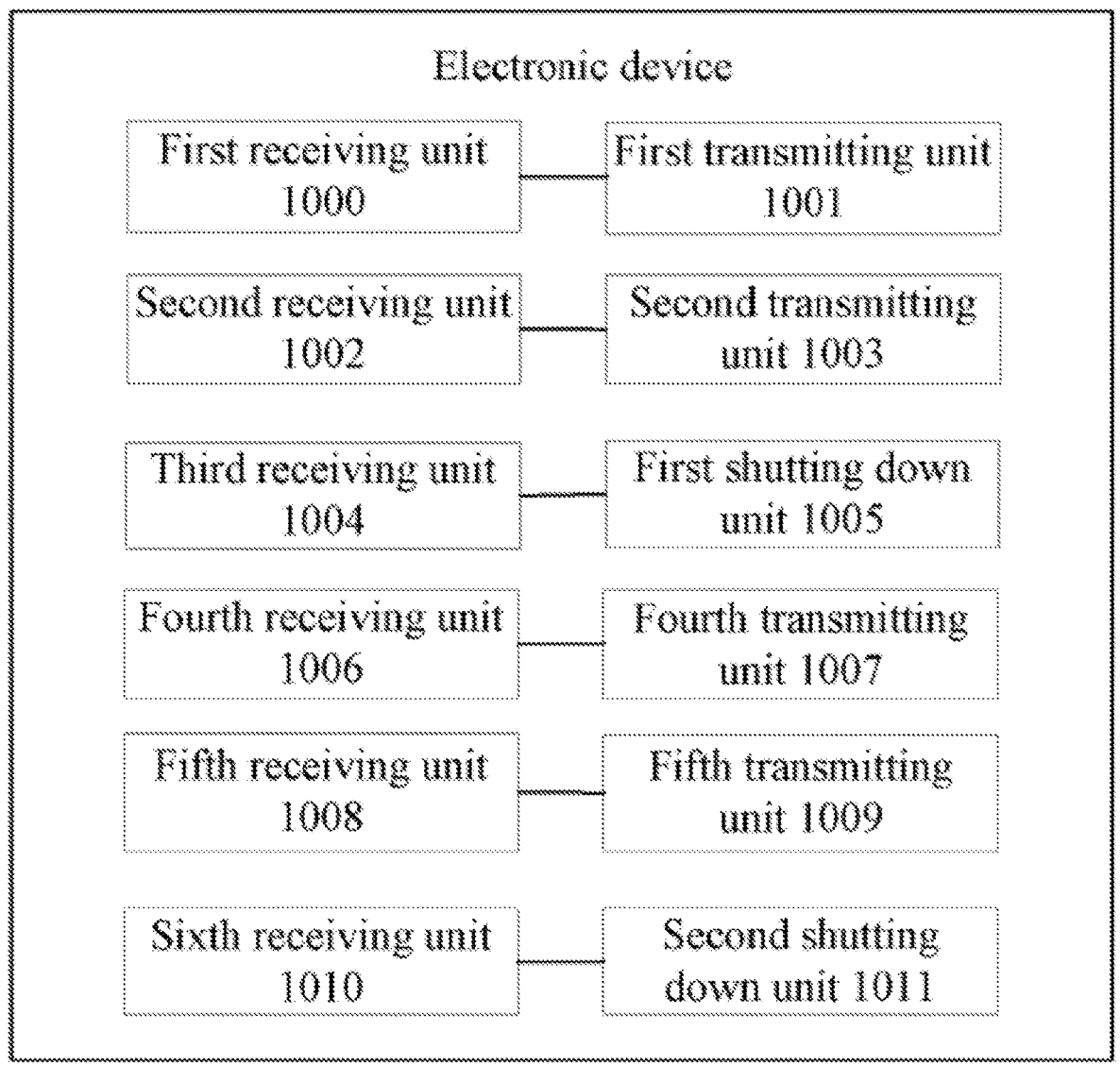
FIG. 10 is a schematic diagram of a structure of an electronic device according to the second embodiment of the present disclosure

FIG. 10 is a schematic diagram of structure of an electronic device according to the second embodiment of the present disclosure As shown in FIG. 10, the electronic device is capable of communicating with a first electronic device, wherein the electronic device comprises a first receiving unit 1000, a first transmitting unit 1001, a second receiving unit 1002, a second transmitting unit 1003, a third receiving unit 1004, a first shutting down unit 1005, a fourth receiving unit 1006, a fourth transmitting unit 1007, a fifth receiving unit 1008, a fifth transmitting unit 1009, a sixth receiving unit 1010, and a second shutting down unit 1011:

the first receiving unit 1000 is configured to receive a first instruction from the first electronic device, to trigger the first transmitting unit 1001; the first transmitting unit 1001 is configured to transmit a first signal with a first parameter;

the second receiving unit 1002 is configured to receive a second instruction from the first electronic device, to trigger the second transmitting unit 1003; the second transmitting unit 1003 is configured to transmit the first signal with a second parameter;

the third receiving unit 1004 is configured to receive a third instruction from the first electronic device, to trigger the first shutting down unit 1005; the first shutting down unit 1005 is configured to stop the transmission of the first signal;

the fourth receiving unit 1006 is configured to receive a fourth instruction from the first electronic device, to trigger the fourth transmitting unit 1007; the fourth transmitting unit 1007 is configured to transmit a second signal with a fourth parameter;

the fifth receiving unit 1008 is configured to receive a fifth instruction from the first electronic device, to trigger the fourth transmitting unit; the fifth transmitting unit 1009 is configured to transmit the second signal with a fifth parameter; and the sixth receiving unit 1010 is configured to receive a sixth instruction from the first electronic device, to trigger the second shutting down unit 1011; the second shutting down unit 1011 is configured to stop the transmission of the second signal;

wherein a signal strength under the second parameter is greater than a signal strength under the first parameter;

a signal strength under the fifth parameter is greater than a signal strength under the fourth parameter Based on the electronic device shown in FIG. 10, the electronic device according to an embodiment of the present disclosure further comprises a measuring unit (not shown in FIG. 10) and a seventh transmitting unit (not shown in FIG. 10):

the measuring unit is configured to, after the electronic device transmits the first signal, measure the first signal transmitted by other electronic devices around the electronic device, and generate a measurement result; and the seventh transmitting unit is configured to send the measurement result to the first electronic device.

As will be appreciated by those skilled in the art, the functions achieved by respective units in the electronic devices shown in FIG. 9 may be understood by making reference to the information processing method described above in the first to seventh embodiments and the related description of the example shown in FIG. 8 The functions of the respective units in the electronic device in FIG. 9 may be implemented by programs running on a processor, and may also be implemented by specific logic circuits.

In case of no conflict, the technical solution in the embodiments described above may be combined.

In the several embodiments provided by present disclosure, it should be understood that the device/apparatus and methods disclosed therein may also be implemented by other manners The above-described device/apparatus embodiments are merely illustrative, for example, the unit division is only a logical function division, there may be other division manners in practical implementation, such as: a plurality of units or components may be combined or may be integrated into another system, or some features may be omitted or not executed In addition, coupling, or direct coupling, or communicative connection between the shown or discussed respective components may be achieved through some interfaces, indirect coupling or communicative connection between devices or units may be electrical, mechanical, or other forms.

Units described above as separate members may be or may not be physically separated, components showed as units may be or may not be physical units; they may be located at one place or distributed to a plurality of network cells; it is possible to select some or all of the units therein to achieve the purpose of solutions in the embodiments according to the actual needs.

Further, respective functional units in the embodiments of the present disclosure may be all integrated in one processing unit and may also be separated as one unit each, or two or more units may also be integrated in one unit; the aforesaid integrated unit may be implemented in the form of hardware or in the form of hardware plus software functional unit.

As will be appreciated by those of ordinary skill in the art: all or part of the steps of the above method embodiments may be completed by instructing relevant hardware through programs, these programs may be stored in a computer readable storage medium, the steps included in the above method embodiments will be executed when the programs are executed; the aforesaid storage medium includes various mediums capable of storing program codes like a mobile storage device, a Read Only Memory (ROM), a magnetic disk, or an optical disk.

Alternatively, the above integrated units of the present disclosure may also be stored in a computer readable storage medium when being implemented in the form of a software functional module and sold and used as an independent product Based on such understanding, the substance or the part that contributes to the prior art of the technical solutions of embodiments of the present disclosure may be reflected in the form of a software product, the computer software product may be stored in a storage medium, and include several instructions for causing a computer apparatus (which may be a personal computer, a server, or a network device) to fully or partially perform the method described in the various embodiments of the present disclosure The aforesaid storage medium includes various mediums capable of storing program codes like a mobile storage device, a Read Only Memory (ROM), a magnetic disk, or an optical disk.

The above described are merely specific implementations of the present disclosure, however, the protection scope of the present disclosure is limited thereto, modifications or replacements that are easily conceivable for those skilled in the art within the technique range disclosed in the present disclosure should all fall into the protection scope of the present disclosure Therefore, the protection scope of the present disclosure should be based on what is claimed in the claims.

The invention claimed is:

1. An apparatus comprising:
a processor for a macro cell base station ("macro cell") for a wireless communication network; and
a memory storing program code executable by the processor to cause the processor to:
determine a group of non-standalone small cell base stations ("small cells") and a user equipment ("UE") within wireless communication range of the small cells, based on position information, wherein the small cells are in a first state of a non-transmitting state that monitors control commands from the macro cell ("off state");
transmit a control command to the small cells in the group to change states from the off state to a second state ("dormant state") wherein in the dormant state, the only reference signal or synchronization signal transmitted by the small cells is a periodic transmission of a discovery reference signal ("DRS");
receive measurements of co-frequency interference between individual small cells of the group;
receive, from the UE, signal strength measurements based on the periodically transmitted DRS for the individual small cells of the group; and
select one of the small cells of the group as a base station for serving the UE, based on the signal strength measurements received from the UE for the individual small cells within the group and on the measurements of co-frequency interference between the individual small cells of the group.

2. The apparatus of claim 1, wherein the processor further notifies the UE to access the wireless communication network through the selected small cell.

3. The apparatus of claim 1, wherein in a first stage, the processor further determines a subset of small cells of the group comprising candidate small cells which satisfy a suitable small cell condition in which:
signal strength measurements comprising a Reference Signal Received Power ("RSRP") received from the UE for the candidate small cells are above a predetermined signal strength threshold that meets an access requirement for the UE; and
co-frequency interference measurements from the candidate small cells are below a predetermined interference threshold that will not cause interference with the other small cell base stations of the group.

4. The apparatus of claim 3, wherein the suitable small cell condition for the candidate small cells is determined to be satisfied for small cells having a RSRP of larger than −110 dBm and a co-frequency interference measurement of less than −150 dBm.

5. The apparatus of claim 3, wherein in the first stage, the processor causes the macro cell to transmit an instruction to stop transmitting the DRS to those small cells of the group that do not satisfy the suitable small cell condition.

6. The apparatus of claim 3, wherein in the first stage, the processor causes the macro cell to transmit an instruction to turn off to those small cells of the group that do not satisfy the suitable small cell condition.

7. The apparatus of claim 3, wherein in the first stage, the processor, in response to determining that none of the small cells of the group satisfy the suitable small cell condition, causes the macro cell to transmit a new first instruction to cause the small cells of the group to transmit the DRS with increased power.

8. The apparatus of claim 3, wherein in a second stage, the processor:
causes the macro cell to transmit a second instruction to the subset of small cells, wherein the second instruction causes the subset of small cells to transmit a cell-specific reference signal ("CRS") having the same transmit power as the DRS transmitted in the first stage by the small cell base station of the subset having the highest RSRP measurement received from the UE; and
selects one of the small cells of the subset as the serving base station for the UE based on which small cells of the subset has the highest RSRP measurement received from the UE for the transmitted CRS.

9. The apparatus of claim 8, wherein in the second stage, the processor, in response to selecting one of the small cells of the subset as the optimal base station for the UE, causes non-selected small cells of the subset to stop transmitting the CRS.

10. The apparatus of claim 8, wherein in the second stage, the processor, in response to selecting the one of the small cells of the subset as the optimal base station for the UE, causes the macro cell to transmit an instruction to cause non-selected small cells of the subset to turn off.

11. The apparatus of claim 1, wherein the processor:
foregoes the first stage for determining signal strength and co-frequency interference measurement based a DRS transmitted by the small cells and instead directly determines whether a small cell of the group transmits a CRS that satisfies a suitable small cell condition comprising having a signal strength above a predetermined threshold that meets an access requirement of the UE and having a co-frequency interference measurement below a predetermined threshold that does not interfere with the other small cells of the group; and selects from among the small cells that satisfy the suitable small cell condition, the small cell that transmits the CRS with the highest signal strength measurement from the UE as the base station for the UE.

12. The apparatus of claim 11, wherein, the processor, in response to determining that none of the small cells of the group that transmits a CRS satisfy the suitable small cell condition, causes the macro cell to transmit an instruction to increase a transmission power of the CRS and in response selects as a base station for the UE from among the one or more small cells that satisfy the suitable small cell condition, the small cell that transmits the CRS with the highest CRS signal strength measurement received from the UE.

13. A method comprising:
determining, based on position information from a detected user equipment ("UE") within wireless communication range of the macro cell, whether the UE is within wireless communication range of a group of non-standalone small cell base stations ("small cells") in a first state that is non-transmitting state that monitors control commands from the macro cell ("off state");
transmitting a control command to the small cells in the group to change states from the off state to a second state ("dormant state") wherein in the dormant state, the only reference signal or synchronization signal transmitted by the small cells is a periodic transmission of a discovery reference signal ("DRS");
receiving measurements of co-frequency interference between individual small cell of the group;
receiving, from the UE, signal strength measurements based on the periodically transmitted DRS for the individual small cells of the group and
selecting one of the small cells as a base station for serving the UE, based on the signal strength measurements received from the UE for the individual small cells within the group and on the measurements of co-frequency interference between the individual small cells of the group.

14. The method of claim 13, further comprising notifying the UE to access the wireless communication network through the small cell selected as the optimal base station.

15. The method of claim 14, further comprising determining a subset of small cells of the group comprising candidate small cells which satisfy a suitable small cell condition in which:
signal strength measurements comprising a Reference Signal Received Power ("RSRP") received from the UE for the candidate small cells are above a predetermined signal strength threshold that meets an access requirement for the UE; and
co-frequency interference measurements from the candidate small cells are below a predetermined interference threshold that will not cause interference with the other small cells of the group.

16. The method of claim 15, further comprising determining the suitable small cell condition to be satisfied in response to the subset of small cells having an RSRP measurement of larger than −110 dBm and a co-frequency interference measurement of less than −150 dBm.

17. The method of claim 15, further comprising:
transmitting a second instruction to the subset of small cells, wherein the second instruction causes the subset of small cells to transmit a cell-specific reference signal ("CRS") having the same transmit power as a DRS transmitted by the small cell base station of the subset having the highest RSRP measurement received from the UE; and
selecting one of the small cells of the subset as the serving base station for the UE based on which small cells of the subset has the highest RSRP measurement received from the UE for the transmitted CRS.

18. A program product comprising a non-transitory computer readable storage medium that stores code executable by a processor, the executable code comprising code to cause a macro cell base station for a wireless communication network to:
determine, based on position information from a detected user equipment ("UE") within wireless communication range of the macro cell, whether the UE is within wireless communication range of a group of non-standalone small cell base stations ("small cells") in a first state that is non-transmitting state that monitors control commands from the macro cell ("off state");
transmit a control command to the small cells in the group to transition from the off state to a second state ("dormant state") wherein in the dormant state, the only reference signal or synchronization signal transmitted by the small cells is a periodic transmission of a discovery reference signal ("DRS");
receive measurements of co-frequency interference between individual small cells of the group;
receive, from the UE, signal strength measurements based on the periodically transmitted DRS for the individual small cells of the group; and
select one of the small cells as a base station for serving the UE, based on the signal strength measurements received from the UE for the individual small cells within the group and on measurements of co-frequency interference between the individual small cells of the group.

* * * * *